J. HAEGE.
Plow.
No. 38,478.             Patented May 12, 1863.
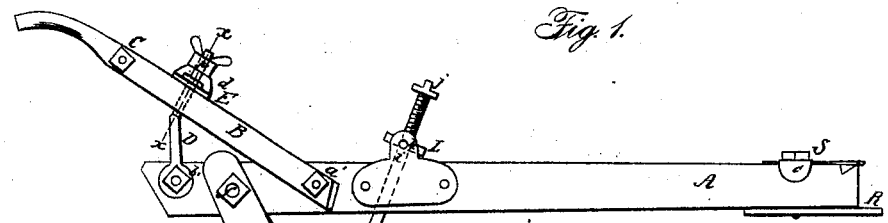
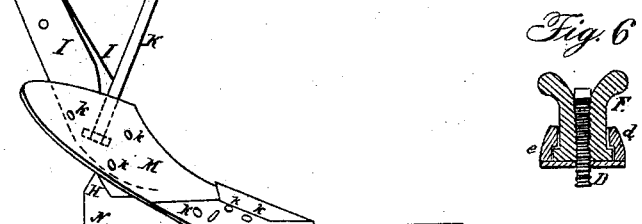
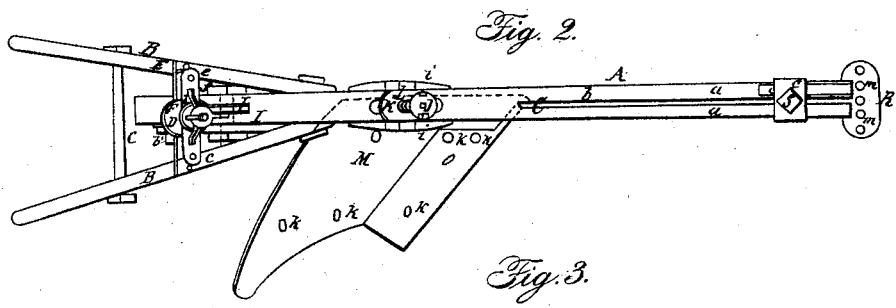
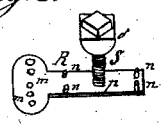
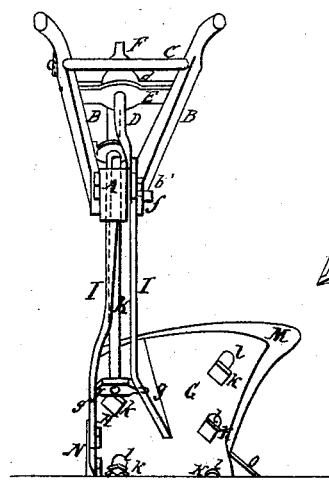
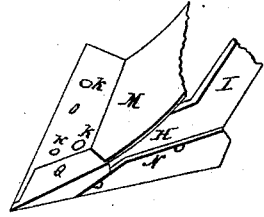
Witnesses:
Inventor:

UNITED STATES PATENT OFFICE.

JACOB HAEGE, OF SHILOH, ILLINOIS.

IMPROVEMENT IN PLOWS.

Specification forming part of Letters Patent No. 38,478, dated May 12, 1863.

*To all whom it may concern:*

Be it known that I, JACOB HAEGE, of Shiloh, in the county of St. Clair and State of Illinois, have invented a new and Improved Plow; and I do hereby declare that the following is a full, clear, and exact description of the same, reference being had to the accompanying drawings, making a part of this specification, in which—

Figure 1 is a side view of my invention; Fig. 2, a plan or top view of the same; Fig. 3, a back view of the same; Fig. 4, a detached perspective view of the front part of the share, mold-board, and landside; Fig. 5, a detached perspective view of the clevis; Fig. 6 a section of a part of the invention, taken in the line $x$ $x$, Fig. 1.

Similar letters of reference indicate corresponding parts in the several figures.

This invention consists in applying or attaching the handles of the plow to the beam in such a manner that they may be raised or lowered to suit the height of the plowman.

The invention further consists in an improvement in the parts employed for adjusting the beam of the plow, in order that the latter may be made to penetrate a greater or less depth into the earth, as may be desired.

To enable those skilled in the art to fully understand and construct my invention, I will proceed to describe it.

A represents the beam of the plow, which is constructed of two separate longitudinal parts, $a$ $a$, (see Fig. 2,) or it may be constructed of a solid piece of wood and slotted vertically, as shown at $b$, the slot extending from the front end of the beam to a suitable point backward, as shown at $c$. If two separate parts, $a$ $a$, be used, said parts may be connected by cross-pieces.

B B represent the handles of the plow, the lower ends of which are attached to the beam A by a bolt, $a'$. The screw-rod is bent or curved, and it passes at its upper end through a bar, E, which is attached to the handles B B just below the rod C, and parallel with the latter, as shown in Fig. 2. On the upper part of the screw-rod, above the bar E, there is placed a thumb-nut, F, the lower part of which is provided with a flange, $c$, (see Fig. 6,) and the lower part of the nut and flange is encompassed by a cap and socket, $d$, which is secured by bolts $e$ $e$ to the bar E. The cap or socket $d$ and bar E retain the nut in proper position, and by turning said nut it will be seen that the handles B B may be raised and lowered to suit the height of the plowman. The cap or socket $d$ is slotted at each side to admit of oil being poured into it to lubricate the nut, so that it may be turned with facility.

G represents the inner or fixed mold-board of the plow, and H the inner landside. These parts have each a vertical bar, I, attached to them, and these bars extend upward parallel with each other, and are attached at their upper ends to the back part of the beam A by a bolt, $f$. Between the two bars I I, near their lower ends, there is fitted a plate, J. This plate is provided with pivots or trunnions $g$ $g$, which are fitted in the bars I, one in each. K is a rod, the lower end of which is secured in the plate J. The upper part of the rod K passes through the beam A, and has a screw-thread cut or formed upon it. The screw portion of the rod K passes through a nut, L, which, like the plate J, is provided with pivots or trunnions $h$ $h$, the latter being fitted in bearings $i$ $i$, attached to the sides of the beam A. The lower end of the rod K is allowed to turn in the plate J, and by turning said rod it will be seen that the front end of the beam A may be raised and lowered, so as to regulate the depth of the penetration of the plow into the earth, as circumstances may require. The upper end of the rod K may be provided with a square, $j$, on which a key or wrench may be fitted, in order to turn said rod.

The mold-board G and landside H, which I previously termed the "inner" or "fixed" ones, do not in reality perform the work of such parts. They merely serve as supports or foundations for the mold-board M and landside N proper. The mold-board M has a share, O, at its lower end, the share being fitted at the lower part of G. The mold-board M corresponds in form to the mold-board G, and is fitted directly upon it, and is secured thereto by screw-bolts $k$, which pass through oblong slots $l$ in the inner or fixed mold-board G, as shown in Fig. 3. The share O is secured on the lower part of G in the same way. By this arrangement it will be seen that the mold-board M may be adjusted higher or lower on the mold-board G, and the share O, which always extends beyond the inner or fixed mold-board G, may be adjusted forward as it wears, so that it may always be kept at a proper distance in front of G, and when the share O is worn out it may be readily removed and a new one adjusted in its place. The mold-board M is always moved or adjusted with the share O, in order that the upper edge of the latter may bear at all times against the lower edge of the former. The outer landside, N, which requires no adjustment, is bolted to the inner landside, H.

Q is a cap, which is welded or brazed to the share O, and is bent downward at its left-hand side, so as to lap over the inner landside, H, as shown in Fig. 4. The upper end of this cap Q projects over the lower left-hand side of the mold-board M. This cap Q strengthens the share O and it protects the front left-hand side or point of the inner or fixed mold-board, G.

Having thus described my invention, what I claim as new, and desire to secure by Letters Patent, is—

1. Raising and lowering or adjusting the handles B B by means of the screw-rod D, attached to the beam A, and provided with a nut, F, fitted within a cap or socket, $d$, which is secured to a bar, E, attached to the handles, all being arranged as and for the purpose herein shown and described.

2. Adjusting the beam A for the purpose of regulating the penetration of the plow by means of the screw-rod K, fitted in the plate J, and nut L, which are hung on pivots or trunnions, as herein set forth.

JACOB HAEGE.

Witnesses:
    D. O'DANIELS,
    I. W. SCOTT.